United States Patent [19]

Nakanishi et al.

[11] 4,271,803

[45] Jun. 9, 1981

[54] INTERNAL COMBUSTION ENGINE

[75] Inventors: Kiyoshi Nakanishi; Takeshi Okumura; Ryuichi Deguchi, all of Susono; Toshio Tanahashi, Toyota, all of Japan

[73] Assignee: Toyota Jidosha Kogyo Kabushiki Kaisha, Toyota, Japan

[21] Appl. No.: 41,397

[22] Filed: May 22, 1979

[30] Foreign Application Priority Data

Jul. 20, 1978 [JP] Japan ................... 53-87673

[51] Int. Cl.³ ........................................ F02M 25/06
[52] U.S. Cl. .................................. 123/432; 123/308; 123/193 P; 123/193 CP
[58] Field of Search ................. 123/127, 75 B, 119 R, 123/30 C, 193 P, 193 CP, 191 M, 191 S, 432, 308, 193 H

[56] References Cited

U.S. PATENT DOCUMENTS

| | | | |
|---|---|---|---|
| 2,028,585 | 1/1936 | Blake | 123/119 R |
| 2,843,103 | 7/1958 | Wyczalek | 123/191 S |
| 3,543,736 | 12/1970 | Suzuki | 123/119 R |
| 4,182,279 | 1/1980 | Sato | 123/191 S |
| 4,194,474 | 3/1980 | Endo | 123/75 B |

FOREIGN PATENT DOCUMENTS

| | | | |
|---|---|---|---|
| 1120063 | 6/1956 | France | 123/52 M |
| 52-29534 | 3/1977 | Japan | 123/52 M |
| 877791 | 9/1961 | United Kingdom | |
| 1153559 | 5/1969 | United Kingdom | 123/52 M |

*Primary Examiner*—Ronald H. Lazarus
*Attorney, Agent, or Firm*—Stevens, Davis, Miller & Mosher

[57] ABSTRACT

An internal combustion engine comprises a first raised portion formed on the inner wall of the cylinder head, a second raised portion formed on the top face of the piston at a position opposite to the first raised portion with respect to the axis of the piston, and a third raised portion formed on the inner wall of the cylinder head above the second raised portion. A first flat squish area is formed between the flat peripheral top face of the piston and the flat bottom face of the first raised portion. A second spherical shell shape squish area is formed between the spherical bottom wall of the third raised portion and the spherical rear face of the second raised portion. A secondary throttle valve is arranged in the intake passage located downstream of the throttle valve of a carburetor. A secondary intake passage is branched off from the intake passage located between the secondary throttle valve and the throttle valve of the carburetor and opens into the intake port at a position near the intake valve. The secondary throttle valve is closed when the engine is operating under a light load, while the secondary throttle valve is opened when an engine is operating under a heavy load.

21 Claims, 4 Drawing Figures

INTERNAL COMBUSTION ENGINE

DESCRIPTION OF THE INVENTION

The present invention relates to a construction of the combustion chamber of an internal combustion engine.

As a method of simultaneously reducing the amount of harmful HC, CO and $NO_x$ components in the exhaust gas, a method of using a lean air-fuel mixture has been used. In addition, as a method of reducing the amount of harmful $NO_x$ components in the exhaust gas, a method of using a mixture containing the recirculated exhaust gas therein has been used. However, either when a lean air-fuel mixture is used or when a mixture containing the recirculated exhaust gas therein is used, a problem occurs in that, since the flame speed of either mixture is very low and the burning velocity is thus low, a stable combustion cannot be obtained. In order to obtain a stable combustion by using a lean air-fuel mixture or a mixture containing the recirculated exhaust gas therein, it is necessary to increase the burning velocity. As of increasing the burning velocity, a method creation a strong turbulence in the combustion chamber can be used. As an engine which is capable of increasing the burning velocity by creating a turbulence in the combustion chamber, the inventor has proposed an engine which comprises a first downwardly projecting raised portion formed on the periphery of the inner wall of the cylinder head and having a flat bottom face forming a first squish area between the flat bottom face of the first raised portion and a flat peripheral portion of the top face of the piston when the piston approaches the top dead center. In addition, this engine further comprises a second upwardly projecting raised portion formed on the top face of the piston at a position opposite to the flat peripheral portion of the top face of the piston with respect to the axis of the cylinder so as to form a second squish area between the inner wall of the cylinder head and the rear face of the second raised portion when the piston approaches the top dead center. In addition, in this engine, the second raised portion has an inclined front face which is exposed to the combustion chamber and smoothly connected to the flat peripheral portion of the piston. At the end of the compression stroke, a swirl motion rotating about the horizontal axis is created in the combustion chamber by a pair of squish flows spouted from the first and the second squish areas, respectively, in the combustion chamber.

In the above-mentioned internal combustion engine, since a swirl motion is created in the combustion chamber, it is true that the burning velocity can be increased. However, in the above-mentioned engine, a swirl motion is caused by the squish flow at the end of the compression stroke and, thus, it is difficult to fully promote the mixing operation of fuel and air before the mixture is ignited. That is, in order to fully mix the air with the fuel or with the recirculated exhaust gas, it is necessary to start the creation of a turbulence at the beginning of the intake stroke and continue to create the turbulence for a long time. An object of the present invention is to provide an internal combustion engine capable of creating a strong swirl motion in the combustion chamber during the intake stroke when an engine is operating under a light load and also capable of creating a further strong swirl motion in the combustion chamber by the squish flow at the end of the compression stroke.

According to the present invention, there is provided an internal combustion engine comprising: a cylinder block having a cylinder bore therein; a cylinder head mounted on the cylinder block and having an inner wall; a first raised portion having on its lower end a flat bottom face and being formed on the periphery of the inner wall of the cylinder head so as to project downwards. A piston reciprocally movable in the cylinder bore has a top face which has a flat peripheral portion approachable to the flat bottom face so as to create a first squish area therebetween at the end of the compression stroke for spouting out a first squish flow along the top face of the piston, the inner wall of the cylinder head and the top face of the piston defining a combustion chamber therebetween. An intake valve is movably mounted on the cylinder head for guiding a comustible mixture into the combustion chamber, and an exhaust valve is movably mounted on the cylinder head for discharging exhaust gas into the atmosphere. A second raised portion is formed on the top face of the piston at a position opposite to the first raised portion with respect to an axis of the piston and has a rear face and a front face exposed to the combustion chamber, the rear face being approachable to the inner wall of the cylinder head so as to create a second squish area therebetween at the end of the compression stroke for spouting out a second squish flow which moves forwards in the upper interior of the combustion chamber in the direction opposite to the spouting direction of the first squish flow, the first and second squish flows cooperating with each other to create a strong swirl motion rotating about a horizontal axis in the combustion chamber. A spark plug having a spark gap is located in the combustion chamber. An intake passage has an inlet. A carburetor has a throttle valve and is arranged in the inlet of said intake passage. Secondary valve means are arranged in the intake passage at a position downstream of the throttle valve and opened in accordance with a reduction in the level of vacuum produced in the intake passage, and an auxiliary intake passage having an outlet and an inlet which opens into the intake passage is located between the throttle valve and the secondary valve means, the outlet of the auxiliary intake passage opening into the intake passage located downstream of the secondary valve means.

The present invention may be more fully understood from the description of a preferred embodiment of the invention set forth below, together with the accompanying drawings.

DESCRIPTION OF A PREFERRED EMBODIMENT

Figure 1:
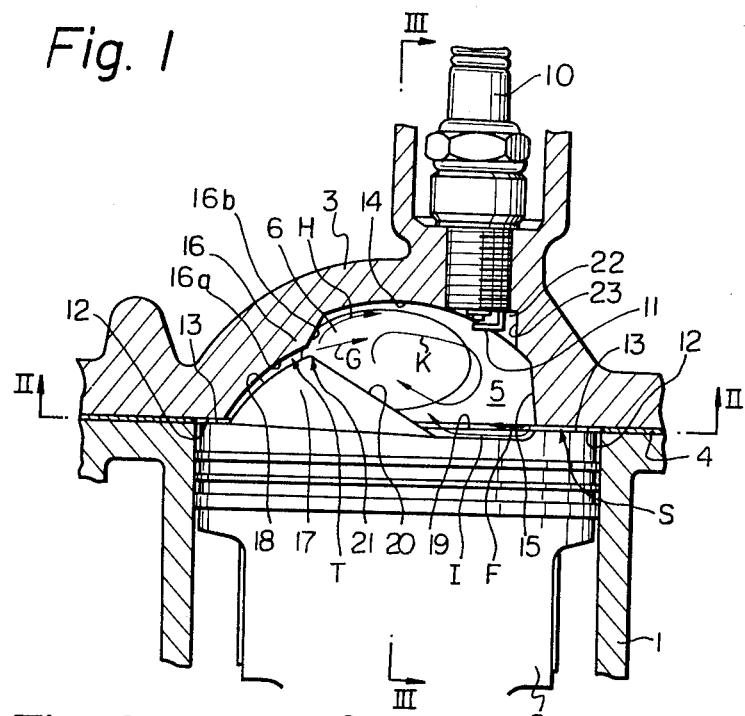
FIG. 1 is a cross-sectional side view of an internal combustion engine according to the present invention.
Figure 2:
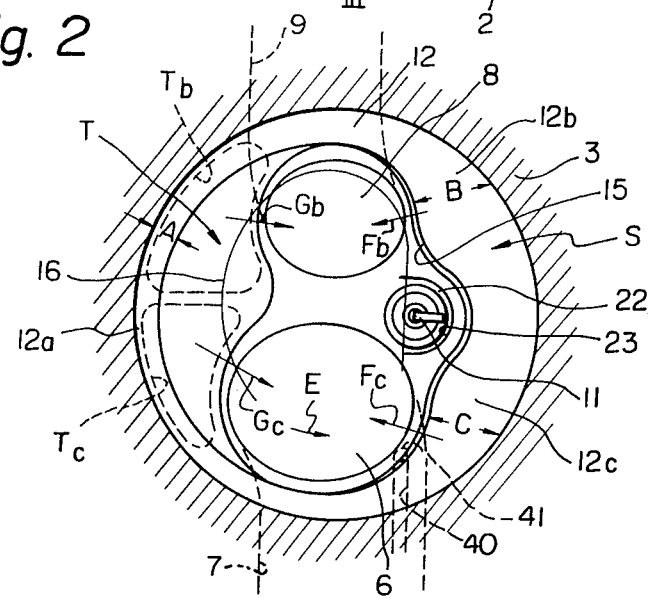
FIG. 2 is a bottom view taken along the line II—II in FIG. 1.
Figure 3:
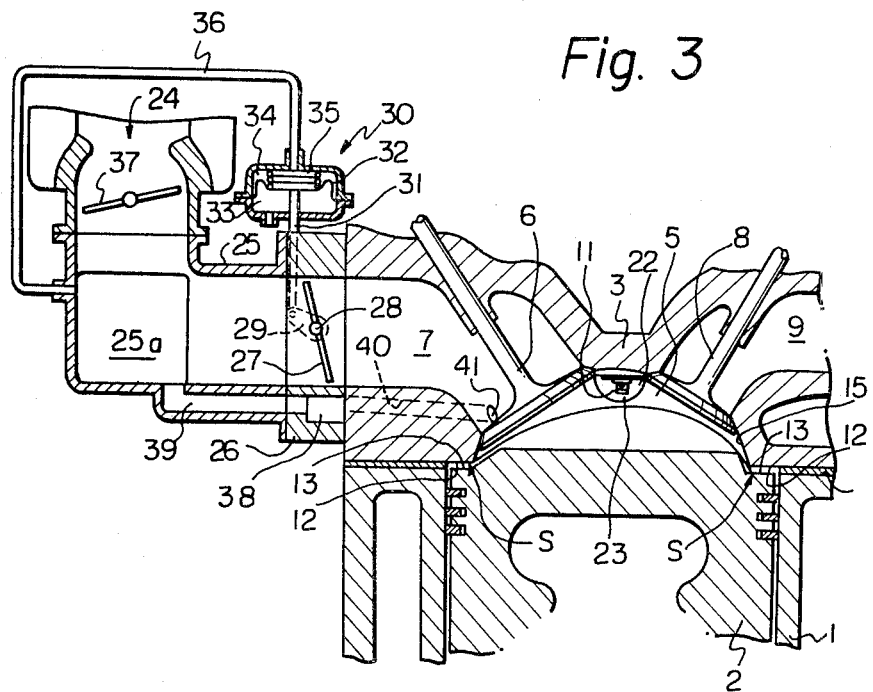
FIG. 3 is a cross-sectional side view taken along the line III—III in FIG. 1.
Figure 4:
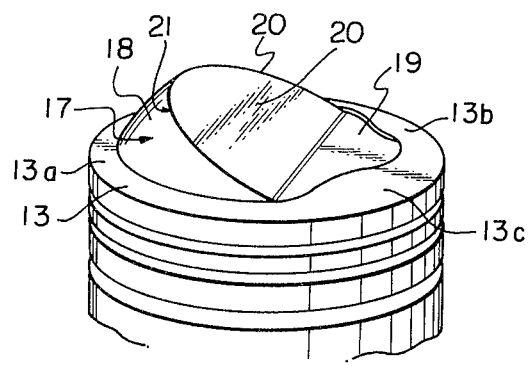
FIG. 4 is a perspective view of the piston illustrated in FIG. 1.

Referring to FIGS. 1 through 3, 1 designates a cylinder block, and 2 a piston reciprocally movable in the cylinder block 1. 3 designates a cylinder head fixed onto the cylinder block 1 via a gasket 4; 5 designates a combustion chamber formed between the top face of the piston 2 and the inner wall of the cylinder head 3. 6 designates an intake valve, 7 and intake port, 8 an exhaust valve, 9 an exhaust port, 10 a spark plug, and 11 an electrode of the spark plug 10. As is illustrated in FIGS. 1 through 3, the inner wall of the cylinder head 3 has an annular flat surface 12 which extends circumferentially over the entire periphery of the inner wall of the cylinder head. The flat surface portion 12a of the annular flat surface 12, which is located on the left side in FIG. 2, has a uniform width illustrated by the arrow A in FIG. 2, while flat surface portions 12b and 12c of the annular flat surface 12, which are located on the right side in FIG. 2, have widths which are wider than the width A of the flat surface portion 12a as illustrated by the arrows B and C in FIG. 2, respectively. In addition, from FIG. 2, it will be understood that the flat surface portion 12b located near the exhaust valve 8 has width B which is wider than width C of the flat surface portion 12c located near the intake valve 6. As is illustrated in FIGS. 1, 3 and 4, an annular flat surface 13 arranged to face the annular flat surface 12 of the cylinder head 3 and having a shape which is approximately equal to that of the annular flat surface 12 is formed on the top face of the piston 2. That is, the flat surface portion 13a of the annular flat surface 13, which is formed on the top face of the piston 2 so as to face the flat surface portion 12a of the cylinder head 3, has a uniform width which is approximately equal to the width A of the annular flat surface 12, and the flat surface portions 13b and 13c of the annular flat surface 13, which are formed on the top face of the piston 2 so as to face the flat surface portions 12b and 12c, respectively, have widths which are wider than the width of the flat surface portion 13a of the piston 2. Consequently, when the piston 2 is positioned at the top dead center as illustrated in FIG. 1, a flat and annular squish area S is formed between the annular flat surface 12 of the cylinder head 3 and the annular flat surface 13 of the piston 2. As illustrated in FIGS. 1 and 3, the top face 14 of the combustion chamber 5 has a spherical shape; in addition, the side wall 15 of the combustion chamber 5 extends approximately vertically from the flat surface portions 12b, 12c of the cylinder head 3 to the top face 14 of the combustion chamber 5. A downwardly projecting raised portion 16 is formed on the top face 14 at a position opposite to the spark plug 10 with respect to the axis of the piston 2, and the bottom wall 16a of the raised portion 16 has a spherical shape. The lower edge of the bottom wall 16a of the raised portion 16 is connected to the flat surface portion 12a of the cylinder head 3, and the upper edge of the bottom wall 16a is connected to the top face 14 of the combustion chamber 5 via a steeply inclined side wall 16b arranged to be exposed to the combustion chamber 5. A raised portion 17 is formed on the top face of the piston 2 at a position opposite to the flat surface portions 13b, 13c of the piston with respect to the axis of the piston 2, and the rear face 18 of the raised portion 17 has a spherical shape complementary to the shape of the bottom wall 16a of the raised portion 16. In addition, the lower edge of the rear face 18 of the raised portion 17 is connected to the flat surface portion 13a of the piston 2. Consequently, when the piston 2 is positioned at the top dead center as illustrated in FIG. 1, a spherical shell shape squish area T is formed between the bottom wall 16a of the raised portion 16 and the rear face 18 of the raised portion 17. In addition, a flat and shallow depression 19 is formed in the central portion of the top face of the piston 2 at a position located inside of the flat surface portions 13b, 13c of the piston 2, and the raised portion 17 has an inclined front face 20 extending from the flat depression 19 to a ridge 21 of the raised portion 17 and arranged to be exposed to the combustion chamber 5. As is illustrated in FIG. 1, the ridge 21 of the raised portion 17 is rounded. As is illustrated in FIGS. 1 through 3, a semi-cylindrical recess 22, which has a particular shape wherein the lower end of the semi-cylinder is obliquely cut, is formed on the top face 14 of the combustion chamber 5 at a position opposite to the squish area T with respect to the axis of the piston 2, and the electrode 11 of the spark plug 10 is arranged in the recess 22. Consequently, the electrode 11 of the spark plug 10 is partially enclosed by a vertically extending semi-cylindrical wall 23. When the piston 2 approaches the top dead center, squish flows shown by the arrows F and G in FIG. 1 are spouted from the squish areas S and T, respectively, and the electrode 11 of the spark plug 10 is arranged on an extension of the squish area T so that the squish flow G impinges directly upon the electrode 11. However, it should be noted that, when the downward movement of the piston 2 are started, a pair of gas streams flowing towards the squish areas S and T in directions which are opposite to those of the squish flows G and F, respectively, is created in the combustion chamber 5.

Referring to FIG. 3, an intake manifold 25 equipped with a carburetor 24 is connected to intake port 7 via a spacer member 26, and a secondary throttle valve 27 is arranged in the spacer member 26. An arm 29 is fixed onto a throttle shaft 28 of the secondary throttle valves 27, and a control rod 31 of a vacuum operated diaphragm apparatus 30 is pivotally connected to the tip of the arm 29. The diaphragm apparatus 30 comprises an atmospheric pressure chamber 33 and a vacuum chamber 34, which are separated by a diaphragm 32. A compression spring 35 is inserted into the vacuum chamber 34 for always biasing the diaphragm 32 towards the atmospheric pressure chamber 33. The vacuum chamber 34 is connected to the inside of the intake manifold 25, located downstream of the throttle valve 37 via a vacuum conduit 36, and the control rod 31 is connected to the diaphragm 32.

As is illustrated in FIG. 3, when the engine is operating under a light load wherein the opening degree of the throttle valve 37 of the carburetor 24 is small, the level of vacuum produced in the intake manifold 25 is large. As a result of this, since the level of vacuum produced in the vacuum chamber 34 of the diaphragm apparatus 30 becomes large, the diaphragm 32 moves towards the vacuum chamber 34 against the spring force of the compression spring 35. As a result of this, the throttle shaft 28 is rotated, and the secondary throttle valve 27 is positioned at its closed position, as illustrated in FIG. 3. On the other hand, when throttle valve 37 of the carburetor 24 is opened to a great extent and, thus, the engine is operating under a heavy load, since the level of vacuum produced in the intake manifold 25 becomes small, the level of vacuum produced in the vacuum chamber 34 also becomes small. As a result of this, since the diaphragm 32 moves towards the atmospheric pressure chamber 33 due to the spring force of the compression spring 35, the throttle shaft 28 is rotated and, thus, the secondary throttle valve 27 is fully opened. As is illustrated in FIG. 3, a distribution channel 38 is formed in the spacer 26 and connected to the collecting portion 25a of the intake manifold 25 via an auxiliary intake passage 39. In addition, a channel branch 40, which is in communication with the distribution channel 38, is provided for each cylinder, and each of the channel branches 40 opens into the respective intake port 7. The opening 41 of each of the channel branches 40 is directed to a valve gap formed between the intake valve 6 and its valve seat and is also directed tangentially to the vertical side wall 15 (FIG. 1) of the combustion chamber. From FIG. 3, it will be understood that the distribution channel 38, the auxiliary intake passage 39 and the channel branches 40 have a cross-sectional area which is very much smaller than that of the manifold branches of the intake manifold 25.

As mentioned above, when an engine is operating under a light load, the secondary throttle valve 27 is positioned at its closed position. Consequently, at this time, the mixture formed in the carburetor 24 is fed into the combustion chamber 5 of the cylinder which is in the intake stroke via the auxiliary intake passage 39, the distribution channel 38, the channel branch 40 and the intake port 7. As is illustrated in FIG. 3, the auxiliary intake passage 39, the distribution channel 38 and the channel branches 40 have an extremely small cross-sectional area. Consequently, since the mixture flows at a high speed in the auxiliary intake passage 39, the distribution channel 38 and the channel branch 40, the flow energy is added to the mixture and, as a result, the vaporization of fuel is promoted. Then, the mixture is spouted from the channel branch 40 into the intake port 7 of the cylinder which is in the intake stroke. At this time, since the opening 41 of the channel branch 40 is directed to the valve gap formed between the valve head of the intake valve 6 and the valve seat thereof when the intake valve 6 is opened, and in addition, since the opening 22 is also directed tangentially to the vertical side wall 15 of the combustion chamber 5, the mixture spouted from the channel branch 40 flows into the combustion chamber 5 at a high speed via the above-mentioned valve gap and, then, moves forward along the vertical side wall 15 of the combustion chamber 5. As is illustrated in FIG. 2, since the vertical side wall 15 is so formed that it is curved along the periphery of the exhaust valve 8, the mixture spouted from the channel branch 40 is guided by the vertical side wall 15 and, thus, swirls in the combustion chamber 5. Therefore, a strong swirl motion shown by the arrow E in FIG. 2 is created in the combustion chamber 5. As a result of this, the mixing operation of the air with the fuel or with the recirculated exhaust gas is considerably promoted in the combustion chamber 5 and, thus, the air-fuel ratio of the mixture becomes uniform over the entire region of the combustion chamber 5. After this, at the time of the compression stroke, when the piston 2 approaches the top dead center, squish flows F and G are spouted from squish areas S and T, respectively. The squish flow F spouted from the squish area S flows towards the front face 20 of the raised portion 17, and the squish flow G spouted from the squish area T moves forward towards the recess 22. Then, the squish flow G impinges upon the semi-cylindrical wall 23, and a microturbulence is thus created in the recess 22. On the other hand, the squish flow F flowing towards the front face 20 of the raised portion 17 from the squish area S moves forward along the front face 20 of the raised portion 17 and then comes into violent contact with the squish flow G spouted from the squish area T. As a result of this violent contact, the flow direction of the squish flow G is changed so that the squish flow G flows along the top face 14 of the combustion chamber 5 as illustrated by the arrow H in FIG. 1. At this time, since the flow direction of the squish flow F is changed by the steeply inclined side wall 16b of the raised portion 16, the squish flow F also flows along the top face 14 of the combustion chamber 5 as illustrated by the arrow H in FIG. 1. By forming the steeply inclined side wall 16b extending upwards from the ridge 21 of the raised portion 17, the squish flow G is not considerably decelerated by the squish flow F, and the squish flow F itself is also not considerably decelerated. Then, the squish flow H flowing along the top face 14 of the combustion chamber 5 passes in front of the recess 22 and moves downwards along the vertical side wall 15. At this time, since the electrode 11 of the spark plug 10 is arranged within the recess 22, the squish flow H does not impinge directly upon the electrode 11 of the spark plug 10. Then, the squish flow H flowing downwardly along the vertical side wall 15 comes into violent contact with the squish flow F spouted from the squish area S; as a result, the flow direction of the squish flow F is changed as illustrated by the arrow I in FIG. 1. At this time, the squish flow G also flows along the flat bottom of the depression 19 as illustrated by the arrow I in FIG. 1. By forming the depression 19 in the top face of the piston 2, the squish flow F is not considerably decelerated by the squish flow H, and the squish flow F is also not considerably decelerated. Thus, a strong swirl motion, shown by the arrow K, which is rotating about a horizontal axis is created in the combustion chamber 5.

Then, the mixture is ignited by the spark plug 10. At this time, since a microturbulence is created in the recess 22 as mentioned previously, the mixture is easily ignited and the flame then rapidly spreads within the recess 22. After this, the flame swirls in the combustion chamber 5 together with the strong swirl motion K and the burning velocity is thus considerably increased. In addition, since the flame swirls in the combustion chamber 5, unburnt HC and CO located in the quench layers formed on the inner wall of the cylinder head 3 and on the top face of the piston 2 are burned. After this, when the downward movement of the piston 2 is started, the unburnt gas in the combustion chamber 5 is sucked into the squish areas S and T together with the flame. As a result, the unburnt HC and CO located in the quench layers formed on the inner wall of the cylinder head 3 and on the top face of the piston 2 within the squish areas S and T are burned.

As mentioned above, when the engine is operating under a heavy load, the secondary throttle valve 27 remains fully opened. Consequently, at this time, since the mixture formed in the carburetor 24 is fed into the combustion chamber 5 via the manifold branch of the intake manifold 25, which has an extremely small flow resistance, and via the intake port 7, also having an extremely small flow resistance, a high volumetric efficiency can be ensured.

In an internal combustion engine having such a construction that a swirl motion is created in the combustion chamber by the squish flow, the strength of the squish flow has a great influence on the strength of the swirl motion. In addition, the surface area of the squish area has a great influence on the strength of the squish flow. However, it is impossible to increase the surface area of the squish flow to a great extent in view of the construction of an engine. In addition, in the case wherein an excessively strong swirl motion is created in the combustion chamber, there is a danger in that a misfire will occur. As a result of experiments conducted by the inventor, in the engine illustrated in FIGS. 1 through 4, it has been proven that, in order to obtain an ease of ignition and a good combustion, it is preferably that a surface area ratio of the sum of the squish area formed on the inner wall of the cylinder head 3 and the squish area formed on the top face of the piston 2 to the sum of the cross-sectional area of the cylinder bore and the surface area of the inner wall of the cylinder head 3 except for the surface area of the vertical side wall 15 be in the range of 30 percent to 50 percent. In addition, it has also been proven that the best ignition and combustion can be obtained when the above-mentioned surface area ratio is in the range of 35 percent to 40 percent. In the present invention, in order to form squish areas S and T having a large surface area while forming the combustion chamber 5 as compact as possible, the squish area S must be so formed that it has an annular shape.

In addition, as mentioned previously, since the flat surface portion 12b of the cylinder head 3 has the width B which is wider than the width C of the flat surface portion 12c of the cylinder head 3, the squish flow spouted from the flat surface portion 12b as illustrated by the arrow Fb in FIG. 2 is stronger than that spouted from the flat surface portion 12c as illustrated by the arrow Fc in FIG. 2. In addition, as is illustrated by the broken lines Tb, Tc in FIG. 2, the squish area T is so formed that the surface area of the squish area portion Tb located near the exhaust valve 8 is considerably greater than that of the squish area portion Tc located near the intake valve 6; as a result, the squish flow Gb spouted from the squish area portion Tb is stronger than the squish flow Gc spouted from the squish area portion Tc. Consequently, a swirl motion which rotates about the horizontal axis and which is created in the combustion chamber 5 beneath the exhaust valve 8 by the pair of squish flows Fb, Gb becomes stronger than a swirl motion which rotates about the horizontal axis ane which is created in the combustion chamber 5 beneath the intake valve 6 by the pair of squish flows Fc, Gc. As is known to those skilled in the art, knocking occurs due to the face that the self-ignition of the mixture located near the exhaust valve 8 is caused. However, by creating a strong swirl motion in the combustion chamber 5 beneath the exhaust valve 8 and causing the flame of the mixture ignited by the spark plut 10 to propagate immediately towards the space around the exhaust valve 8, it is possible to prevent knocking from occurring.

According to the present invention, since a strong swirl motion can be created in the combustion chamber during the intake stroke, the mixing operation of air and fuel is promoted. In addition, since a strong swirl motion can be caused in the combustion chamber by the squish flow, the burning velocity is considerably increased. As a result, a stable combustion can be obtained and, at the same time, the specific fuel consumption can be improved.

While the invention has been described with reference, to a specific embodiment chosen for purposes of illustration, it should be apparent that numerous modifications can be made thereto by those skilled in the art without departing from the spirit and scope of the invention.

What is claimed is:

1. An internal combustion engine comprising:
   a cylinder block having a cylinder bore therein;
   a cylinder head having an inner wall mounted on said cylinder block;
   a first raised portion having on its lower end a flat bottom face and being formed on the periphery of the inner wall of said cylinder head so as to project downwards;
   a piston reciprocally movable in said cylinder bore and having a top face which has a flat peripheral portion approachable to said flat bottom face so as to create a first squish area therebetween at the end of the compression stroke for spouting out a first squish flow along the top face of said piston;
   a combustion chamber defined by the inner wall of said cylinder head and the top face of said piston;
   an intake valve movably mounted on said cylinder head for leading a combustible mixture into said combustion chamber;
   an intake valve seat;
   an exhaust valve movably mounted on said cylinder head for discharging exhaust gas into the atmosphere;
   a second raised portion formed on the top face of said piston at a position opposite to said first raised portion with respect to an axis of said piston and having a rear face and a front face exposed to said combustion chamber, said rear face being approachable to the inner wall of said cylinder head so as to create a second squish area therebetween at the end of the compression stroke for spouting out a second squish flow which moves forward in the upper interior of said combustion chamber in the direction opposite to the spouting direction of said first squish flow, said first and second squish flows cooperating with each other to create a strong swirl motion rotating about a horizontal axis in said combustion chamber;
   a spark plug having a spark gap located in said combustion chamber;
   an intake passage having an inlet;
   an carburetor having a throttle valve arranged in the inlet of said intake passage;
   secondary valve means arranged in said intake passage at a position downstream of said throttle valve, said secondary valve means being opened in accordance with a reduction in the level of vacuum produced in said intake passage; and
   an auxillary intake passage having a cross-sectional area less than that of said intake passage, having an inlet which opens into said intake passage located between said throttle valve and said secondary valve means, and having an outlet directed to a valve gap formed between said intake valve and said intake valve seat when said intake valve is open.

2. An internal combustion engine as claimed in claim 1, wherein said first raised portion has an approximately vertical side wall, the outlet of said auxiliary intake passage being directed tangentially to said vertical side wall.

3. An internal combustion engine comprising:
   a cylinder block having a cylinder bore therein;
   a cylinder head having an inner wall mounted on said cylinder block;
   a first raised portion having on its lower end a flat bottom face and being formed on the periphery of the inner wall of said cylinder head so as to project downwards;
   a piston reciprocally movable in said cylinder bore and having a top face which has a flat peripheral portion approachable to said flat bottom face so as to create a first squish area therebetween at the end of the compression stroke for spouting out a first squish flow along the top face of said piston;

a combustion chamber defined by the inner wall of said cylinder head and the top face of said piston;

an intake valve movably mounted on said cylinder head for leading a combustible mixture into said combustion chamber;

an intake valve seat;

an exhaust valve movably mounted on said cylinder head for discharging exhaust gas into the atmosphere;

a second raised portion formed on the top face of said piston at a position opposite to said first raised portion with respect to an axis of said piston and having a rear face and a front face exposed to said combustion chamber, said rear face being approachable to the inner wall of said cylinder head so as to create a second squish area therebetween at the end of the compression stroke for spouting out a secod squish flow which moves forward in the upper interior of said combustion chamber in the direction opposite to the spouting direction of said first squish flow, said first and second squish flows cooperating with each other to create a strong swirl motion rotating about a horizontal axis in said combustion chamber;

a spark plug having a spark gap located in said combustion chamber;

an intake passage having an inlet;

a carburetor having a throttle valve arranged in the inlet of said intake passage;

secondary valve means arranged in said intake passage at a position downstream of said throttle valve, said secondary valve means being opened in accordance with a reduction in the level of vacuum produced in said intake passage; and an auxiliary intake passage having a cross-sectional area less than that of said intake passage, having an inlet which opens into said intake passage located between said throttle valve and said secondary valve means, and having an outlet directed to a valve gap formed between said intake valve and said intake valve seat when said intake valve is open, said first raised portion having an approximately vertical sidewall, the outlet of said auxillary intake passage being directed tangentially to said approximately vertical sidewall.

4. An internal combustion engine as claimed in claim 1 or 3 wherein said secondary valve means comprises a secondary throttle valve arranged near said intake valve.

5. An internal combustion engine as claimed in claim 4, wherein said engine comprises a plurality of cylinders, said secondary throttle valve being provided for each cylinder.

6. An internal combustion engine as claimed in claim 1 or 3, wherein said engine further comprises a vacuum operated diaphragm apparatus connected to said secondary valve means for opening said secondary valve means in accordance with a reduction in the level of vacuum produced in said intake passage.

7. An internal combustion engine as claimed in claim 1 or 3, wherein said engine further comprises a third raised portion formed on the inner wall of said cylinder head above said second raised portion and having a bottom wall which cooperates with said rear face of said second raised portion for creating said second squish area therebetween.

8. An internal combustion engine as claimed in claim 7, wherein said bottom wall of said third raised portion has a spherical shape, said rear face of said second raised portion having a shape which is complementary to the shape of said spherical bottom wall for creating a spherical shell shaped squish area between said rear face and said spherical bottom wall.

9. An internal combustion engine as claimed in claim 7, wherein said third raised portion has a steeply inclined side wall extending upwards from a ridge of said second raised portion.

10. An internal combustion engine as claimed in claim 1 or 3, wherein said first raised portion has a horizontally flat bottom face and an approximately vertical side wall exposed to said combustion chamber, said first squish area extending in a horizontal plane.

11. An internal combustion engine as claimed in claim 10, wherein a depression is formed on the top face of said piston and has an approximately vertical peripheral wall extending downwards from a lower edge of the vertical side wall of said first raised portion.

12. An internal combustion engine as claimed in claim 11, wherein the front face of said second raised portion is smoothly connected a bottom wall of said depression.

13. An internal combustion engine as claimed in claim 12, wherein said front face of said second raised portion is formed so as to be flat.

14. An internal combustion engine as claimed in claim 1 or 3, wherein said first squish area extends along a periphery of the top face of said piston over the entire periphery thereof and has an annular shape.

15. An internal combustion engine as claimed in claim 14, wherein a surface area ratio of the sum of said first and second squish areas formed on the inner wall of said cylinder head and said first and second squish areas formed on the top face of said piston to the sum of the cross-sectional area of said cylinder bore and the surface area of the inner wall of said cylinder head, except the surface area of a vertical side wall of said first raised portion, is in the range of 30 percent to 50 percent.

16. An internal combustion engine as claimed in claim 15, wherein said surface area ratio is in the range of 35 percent to 40 percent.

17. An internal combustion engine as claimed in claim 1 or 3, wherein the surface area of said first and second squish areas located near said exhaust valve is larger than that of said first and second squish areas located near said intake valve.

18. An internal combustion engine as claimed in claim 1 or 3, wherein said spark plug is arranged in a recess formed in the inner wall of said cylinder head at a position located remote from said second squish area and near said first raised portion.

19. An internal combustion engine as claimed in claim 18, wherein said recess is arranged on an extension of said second squish area.

20. An internal combustion engine as claimed in claim 18, wherein said recess has a vertically extending semicylindrical wall arranged on said extension of said second squish area.

21. An internal combustion engine as claimed in claim 18, wherein said combustion chamber has a spherical top face, said recess being formed on said spherical top face.

* * * * *